3,027,250
PRODUCTION OF NON-CAKING UREA
Walter Michelitsch, Ludwigshafen (Rhine), Oppau, Germany, assignor to Badische Anilin- & Soda-Fabrik Aktiengesellschaft, Ludwigshafen (Rhine), Germany
No Drawing. Filed Sept. 6, 1957, Ser. No. 682,273
Claims priority, application Germany Oct. 2, 1956
4 Claims. (Cl. 71—64)

This invention relates to improvements in the production of urea which is stable in storage and remains strewable.

Urea is a very widespread fertilizer, especially in tropical and sub-tropical regions, and a good stability in storage and a good spreadability is required of the same. Since urea has a strong tendency to agglomerate, it is often dusted with substances such as kieselguhr, clay, chalk or talc in amounts up to about 5% of the total weight in order to improve its stability in storage. However also such urea fertilizers do not always satisfy the requirements to be placed on them. This is also true of urea to which dehydrated aluminum ammonium sulfate has been added according to a known proposal. Such additions forming water of crystallisation become saturataed with water when stored and can then no longer protect the urea from deliquescence.

I have now found that urea which is very stable in storage, free-flowing and readily strewable, is obtained by dusting it with small amounts of finely powdered basic aluminium sulfate. In general more than 1 to 2% by weight of the aluminium sulfate is not necessary to produce the effect. Basic aluminum sulfate is described in the following references: Gmelin's Handbuch der Anorganischen Chemie, Aluminum, Part B, page 277; Journal of the American Chemical Society, vol. XIV (1894), pages 153–156; The Journal of Physical Chemistry, vol. XVIII (1913–14), pages 401, 402 and 407.

The following example will further illustrate this invention but the invention is not restricted to this example.

*Example*

98 kilograms of urea in the form of pellets having a diameter of 2 to 3 millimeters are dusted with 2 kilograms of finely pulverized basic aluminium sulfate with 12% $SO_4$-content in a mixing drum. The finely pulverulent material adheres very well to the urea pellets. The powdered urea is colorless.

The urea thus dusted is charged into two lined jute sacks, 50 kilograms into each. The sacks are laid side by side, covered with an iron plate and weighted with lead bars weighing 2,000 kilograms. This corresponds to the usual stacking height of 22 sacks one upon another in overseas transport. The two sacks are left under this load for two months. Then the lead bars and the iron plate are removed and the sacks examined. The sacks feel soft and the contents of the sacks trickle freely. The moisture content before and after storage is 0.3%.

Urea behaves in the same way when it is in fine crystals which have been dusted with 2% of the same aluminium sulfate and stored under the same conditions.

For purposes of comparison, 98 kilograms of urea in the form of pellets having a diameter of 2 to 3 millimetres are dusted with 2 kilograms of finely powdered brown kieselguhr in a mixing drum. The urea thus dusted is stored as above described. After the storage, the sacks feel hard and the contents of the sacks are agglomerated. The sacks only become soft after they have been thrown down four times from a height of 2 meters and the contents of the sack are then able to trickle freely to the extent of 80% only, the remainder consisting of lumps of up to 10 centimeters.

What I claim is:
1. A freely-flowing fertilizer composition consisting essentially of urea particles dusted with an adherent coating of finely pulverized basic aluminum sulfate in an amount sufficient to prevent agglomeration of the urea particles.
2. A composition as claimed in claim 4 wherein said urea particles are pellets having a diameter of about 2 to 3 millimeters.
3. A composition as claimed in claim 4 wherein said urea particles are fine crystals.
4. A freely-flowing fertilizer composition consisting essentially of urea particles dusted with an adherent coating of finely pulverized basic aluminum sulfate in an amount not more than about 2% by weight of the total composition and sufficient to prevent agglomeration of the urea particles.

References Cited in the file of this patent

UNITED STATES PATENTS

| | | |
|---|---|---|
| 2,307,253 | Yee et al. | Jan. 5, 1943 |
| 2,369,110 | Harford | Feb. 6, 1945 |
| 2,480,814 | Punshon et al. | Aug. 30, 1949 |
| 2,614,945 | Krisan | Oct. 21, 1952 |
| 2,660,604 | Michelitsch | Nov. 24, 1953 |
| 2,725,397 | Dijksman et al. | Nov. 29, 1955 |

FOREIGN PATENTS

| | | |
|---|---|---|
| F12609IV 6/12(o) | Germany | Nov. 17, 1955 |
| 697,141 | Germany | Oct. 7, 1940 |
| 1,140,149 | France | June 11, 1957 |
| 164,254 | Austria | Oct. 25, 1949 |